United States Patent
Kamiya

(10) Patent No.: US 9,473,704 B2
(45) Date of Patent: Oct. 18, 2016

(54) CAMERA APPARATUS, AND METHOD OF GENERATING VIEW FINDER IMAGE SIGNAL

(71) Applicant: SONY CORPORATION, Minato-ku (JP)

(72) Inventor: Koji Kamiya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/508,444

(22) Filed: Oct. 7, 2014

(65) Prior Publication Data
US 2015/0138418 A1    May 21, 2015

(30) Foreign Application Priority Data
Nov. 19, 2013  (JP) ................. 2013-239391

(51) Int. Cl.
*H04N 5/232* (2006.01)
*G03B 17/20* (2006.01)
*G03B 13/02* (2006.01)

(52) U.S. Cl.
CPC .......... *H04N 5/23293* (2013.01); *G03B 13/02* (2013.01); *G03B 17/20* (2013.01)

(58) Field of Classification Search
CPC ............. H04N 5/23293; G03B 13/02; G03B 17/561; F16M 11/04–11/14; A45F 2200/0533
See application file for complete search history.

(56) References Cited

U.S. PATENT DOCUMENTS

| | | | |
|---|---|---|---|
| 6,195,122 B1* | 2/2001 | Vincent ................. | G01C 11/02 348/169 |
| 2009/0067826 A1* | 3/2009 | Shinohara .............. | G03B 17/18 396/50 |
| 2009/0096910 A1* | 4/2009 | Yasuda .............. | H04N 5/23293 348/333.01 |
| 2011/0310283 A1* | 12/2011 | Shiozaki ............ | H04N 5/23293 348/333.06 |
| 2013/0027570 A1* | 1/2013 | Kinoshita .......... | H04N 5/23293 348/207.1 |
| 2013/0076854 A1* | 3/2013 | Ihara .................. | H04N 5/23238 348/36 |

FOREIGN PATENT DOCUMENTS

JP    2009-133945    6/2009

* cited by examiner

*Primary Examiner* — Christopher K Peterson
(74) *Attorney, Agent, or Firm* — Oblon, McClelland, Maier & Neustadt, L.L.P

(57) ABSTRACT

A camera apparatus includes: a display signal generation section configured to generate an indicator display signal for displaying an indicator at a position in accordance with an inclination of a camera body in a predetermined direction; and a combination section configured to combine a captured image signal with the indicator display signal in order to obtain a view finder image signal, wherein the display signal generation section generates the indicator display signal such that a display of the indicator is masked using a mask area having a predetermined width and with a position corresponding to a predetermined inclination of the indicator in a movement direction as center.

12 Claims, 8 Drawing Sheets

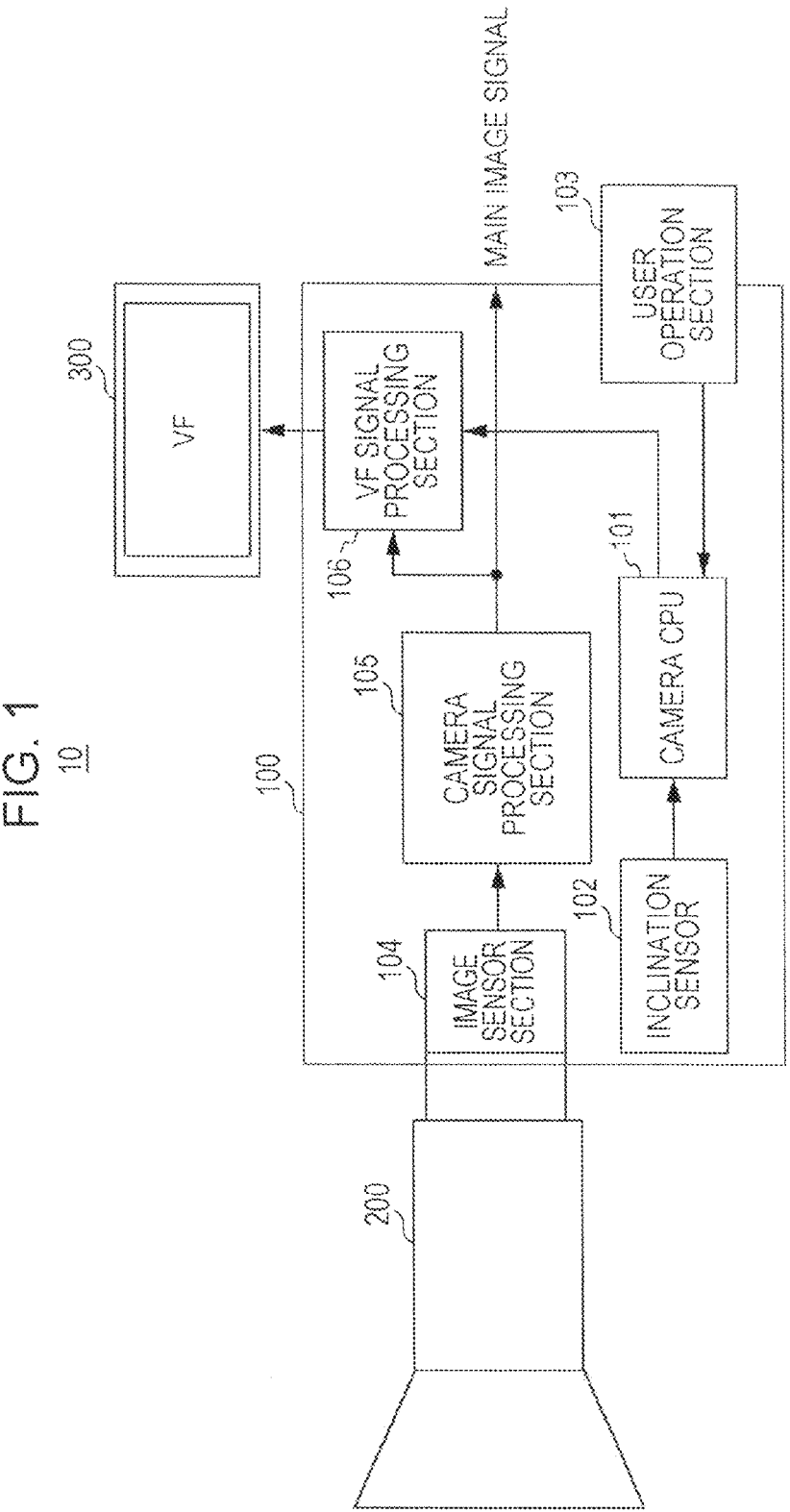

CAMERA APPARATUS, AND METHOD OF GENERATING VIEW FINDER IMAGE SIGNAL

CROSS REFERENCE TO RELATED APPLICATIONS

This application claims the benefit of Japanese Priority Patent Application JP 2013-239391 filed Nov. 19, 2013, the entire contents of which are incorporated herein by reference.

BACKGROUND

The present disclosure relates to a camera apparatus, and a method of generating a view finder image signal. In particular, the present disclosure relates to a camera apparatus provided with an inclination sensor, and the like.

In capturing an image without using a tripod, it is one of important items for a camera operator to keep horizontality (the inclination of a camera body to be horizontal) of an image. To date, a proposal has been made of a camera apparatus including an inclination sensor inside the camera body, and provided with a function of displaying horizontality in a view finder screen (for example, refer to Japanese Unexamined Patent Application Publication No. 2009-133945).

SUMMARY

An image in a view finder is important information for a camera operator in order to grasp an image to be captured, to determine an angle of view, and to adjust the focus, and the like. Accordingly, the camera operator has been facing a dilemma in that extra information ought not to be displayed while important information ought to be displayed.

It is desirable to make it possible to favorably display horizontality, and the like in a view finder.

According to an embodiment of the present technique, there is provided a camera apparatus including: a display signal generation section configured to generate an indicator display signal for displaying an indicator at a position in accordance with an inclination of a camera body in a predetermined direction; and a combination section configured to combine a captured image signal with the indicator display signal in order to obtain a view finder image signal, wherein the display signal generation section generates the indicator display signal such that a display of the indicator is masked using a mask area having a predetermined width and with a position corresponding to a predetermined inclination of the indicator in a movement direction as center.

In the present technique, the display signal generation section generates an indicator display signal for displaying an indicator at a position in accordance with the inclination of the camera body in a predetermined direction. For example, the predetermined direction may be set to a right and left direction, or a front and back direction. For example, an inclination sensor for detecting an inclination in a predetermined direction may be provided. The combination section combines the captured image signal with an indicator display signal to obtain a view finder image signal. The display signal generation section generates an indicator display signal such that a display of an indicator is masked in a mask area having a predetermined width with a position corresponding to a predetermined inclination of the indicator in the movement direction as center. For example, the predetermined inclination may be set to be horizontal (inclination 0).

In this manner, in the present technique, an indicator display signal is generated such that a display of an indicator is masked by a mask area with a position corresponding to a predetermined inclination with center. Accordingly, if the inclination in the predetermined direction of the camera body in a steady state or a normal state is a predetermined inclination, it is possible to suppress a display area of the indicator in the view finder in the steady state or the normal state, and thus it becomes possible to reduce a hindrance of an image display.

In this regard, in the above-described technique, for example, the camera apparatus may further include a user operation section configured to set the predetermined width (the width of the mask area). Thereby, it becomes possible for a camera operator (user) to set the width of the mask area to a width convenient for him or her.

Also, in the above-described technique, the predetermined width (the width of the mask area) may be set greater than the width of the indicator. In this case, it becomes possible to completely eliminate the display area of the indicator in the view finder in the steady state or in the normal state, for example.

Also, in the above-described embodiment, the display signal generation section may generate the indicator display signal such that a display mode, for example a color or a pattern, of the indicator is different on one side and the other side with a position corresponding to the predetermined inclination of the indicator in a movement direction as center. In this case, it becomes possible for the camera operator (user) to easily determine to which of one side or the other side, the camera body is inclined with respect to the predetermined inclination by the display mode of the indicator.

According to another embodiment of the present technique, there is provided a camera apparatus including: a display signal generation section configured to generate an indicator display signal for displaying an indicator at a position in accordance with a stage of a predetermined state of a camera; and a combination section configured to combine a captured image signal with the indicator display signal in order to obtain a view finder image signal, wherein the display signal generation section generates the indicator display signal such that a display of the indicator is masked using a mask area having a predetermined width and with a position corresponding to a specific stage of the predetermined state of the camera in a movement direction of the indicator as center.

According to another embodiment of the present technique, there is provided a camera apparatus including: a display signal generation section configured to generate an indicator display signal for displaying an indicator at a position in accordance with an inclination of a camera body in a predetermined direction; and a combination section configured to combine a captured image signal with the indicator display signal in order to obtain a view finder image signal, wherein the display signal generation section generates the indicator display signal such that a display mode of the indicator is different on one side and the other side with a position corresponding to the predetermined inclination of the indicator in a movement direction as center.

With the present technique, it is possible to favorably display horizontality, and the like in the view finder. In this regard, the advantages described in this specification are only examples, and not limited, and thus further advantages may also be obtained.

BRIEF DESCRIPTION OF THE DRAWINGS

FIG. 1 is a block diagram illustrating an example of a configuration of a camera system according to an embodiment;

DETAILED DESCRIPTION OF EMBODIMENTS

Figure 2A:
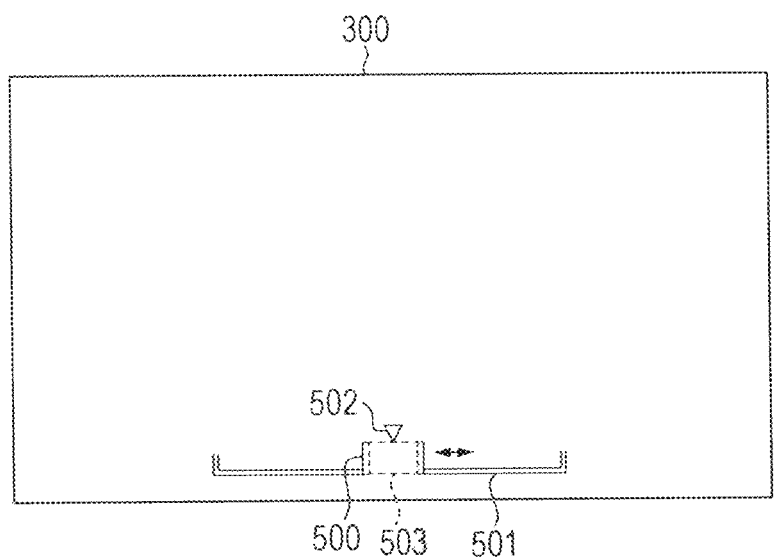
FIGS. 2A and 2B are diagrams illustrating a display example of an indicator in a view finder.

In the following, a description will be given of a mode for carrying out the present disclosure (hereinafter referred to as an embodiment). In this regard, the description will be given in the following order.

1. Embodiments
2. Variations
1. Embodiments
Example of Configuration of Camera System FIG. 1 illustrates an example of a configuration of a camera system 10 as an embodiment. The camera system 10 includes a camera apparatus (camera body) 100, a lens unit 200, and a view finder 300. The lens unit 200 is attached to a lens mount section, which is a front part of the camera apparatus 100.

The camera apparatus 100 includes a camera CPU 101, an inclination sensor 102, a user operation section 103, an image sensor section 104, a camera signal processing section 105, and a VF signal processing section 106. The camera CPU 101 controls operation of each section of the camera apparatus 100. The inclination sensor 102 is connected to the camera CPU 101, and detects an inclination of the camera body in a predetermined direction, for example in the right and left direction here. The user operation section 103 is connected to the camera CPU 101, and forms a user interface for a user to perform various kinds of operation. In this embodiment, it is possible to perform setting operation of the width of the mask area described later using the user operation section 103.

The image sensor section 104 includes an imaging device, such as a CMOS image sensor, or the like, and outputs a captured image signal corresponding to a subject. The lens unit 200 described above forms an image of the subject on the imaging face of the imaging device. The camera signal processing section 105 processes the captured image signal that is output from the image sensor section 104, and outputs an image signal as output of the camera apparatus 100. The camera signal processing section 105 performs processing, such as gain control, white balance adjustment, gamma correction, and the like, for example.

The VF signal processing section 106 generates a view finder image signal on the basis of the image signal that is output from the camera signal processing section 105, and sends the view finder image signal to the view finder 300. The VF signal processing section 106 generates a display signal, such as an indicator display signal, and the like, for example, on the basis of a display control signal sent from the camera CPU 101. Then, the VF signal processing section 106 combines this display signal with the image signal (captured image signal) output from the camera signal processing section 105 to generate the view finder image signal.

Here, the indicator display signal is a display signal for displaying an indicator 500 at a position in accordance with the inclination of the current camera body in the right and left direction. The camera CPU 101 generates and sends a display control signal for causing the VF signal processing section 106 to generate the indicator display signal on the basis of the inclination of the camera body in the right and left direction, which is detected by the inclination sensor 102.

FIG. 2A illustrates a display example of the indicator 500 in the view finder 300. The indicator 500 is rectangular, for example. In this regard, a captured image is also display in the view finder 300 at the same time. However, for simplification of the figure, the captured image is omitted here. A guideline 501 is displayed correspondingly to a movement lane of the indicator 500. Also, an inverted triangular center mark 502 indicating a position corresponding to a predetermined inclination, here, horizontality (inclination 0) is displayed. In this regard, the guideline 501, and the center mark 502 are not necessarily to be displayed, and thus may not be displayed.

Figure 3:
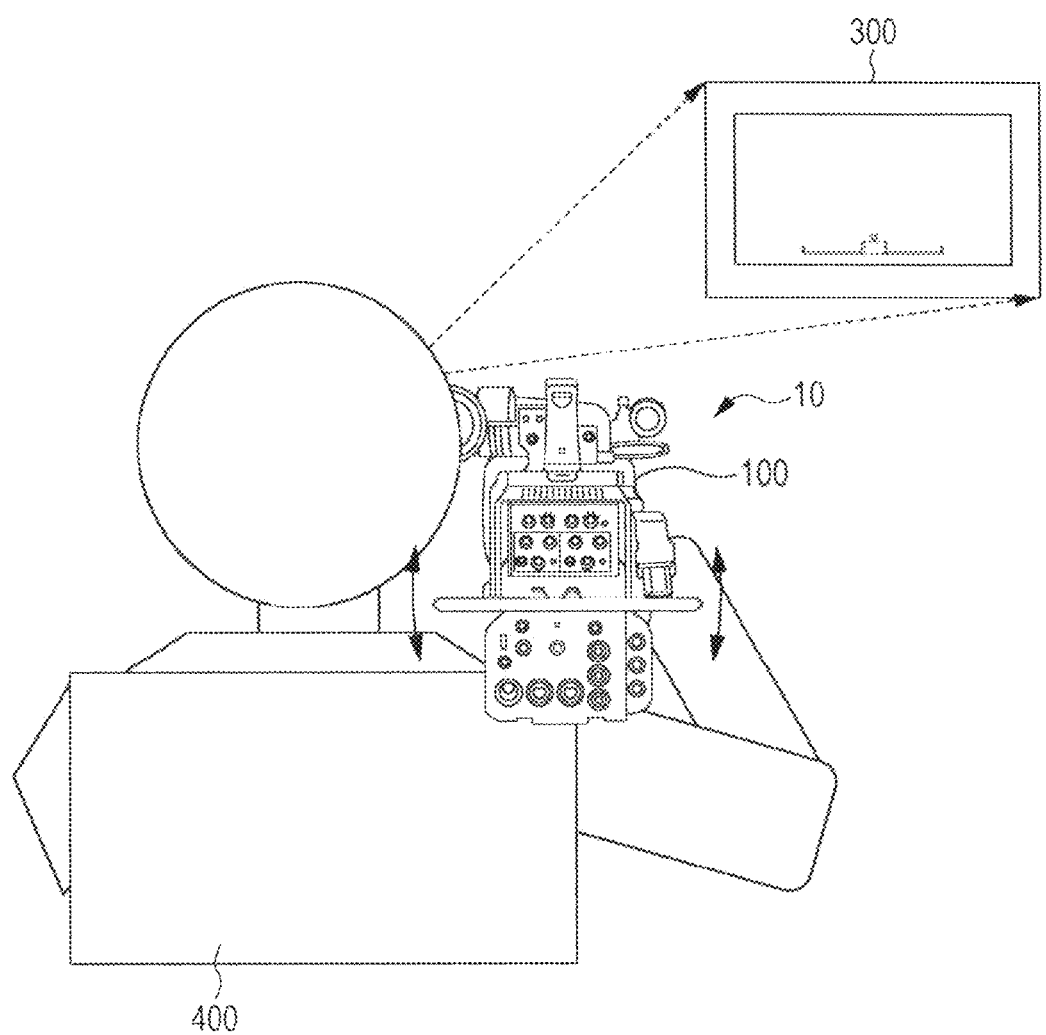
FIG. 3 is a diagram schematically illustrating a state in which a camera operator is capturing an image using the camera system.

FIG. 3 is a diagram schematically illustrating a state in which a camera operator 400 is capturing an image using the camera system 10. The display position of the indicator 500 moves in the right and left direction in accordance with a change in the inclination of the camera apparatus (camera body) 100 in the right and left direction. That is to say, if the camera apparatus 100 inclines right downward, the position of the indicator 500 moves to the right side by a distance corresponding to the size of the inclination from the position corresponding to horizontality (the position indicated by the center mark 502). On the other hand, if the camera apparatus 100 inclines left downward, the position of the indicator 500 moves to the left side by a distance corresponding to the size of the inclination from the position indicated by the center mark 502.

Figure 2B:
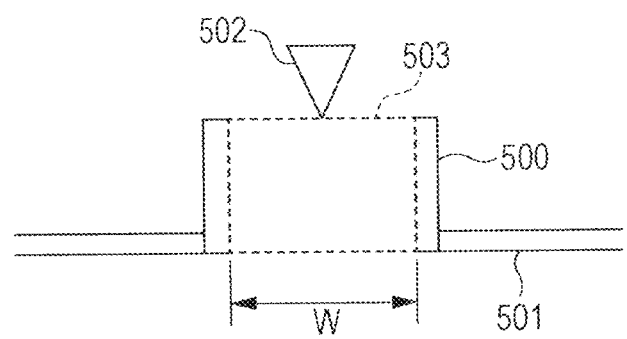

In this embodiment, as illustrated in FIG. 2B, a mask area 503 having a predetermined width W with the position (the position indicated by the center mark 502) corresponding to horizontality of the indicator 500 in the movement direction as center. The VF signal processing section 106 generates the indicator display signal such that the display of the indicator 500 is masked by the mask area 503. That is to say, the part of the indicator 500 included in the mask area 503 becomes a lost state.

FIGS. 2A and 2B illustrate a display example of the case where the inclination of the camera apparatus (camera body) 100 in the right and left direction is horizontal (inclination 0), the center of the indicator 500 is located at the position (the position illustrated by the center mark 502) corresponding to horizontality, and the width of the indicator 500 is greater than the width W of the mask area 503. In this case, the right and left ends of the indicator 500 are displayed with a same width in a state of sticking out from the right side and the left side of the mask area 503.

The camera operator (user) is allowed to set the predetermined width W, which is the width of the mask area 503, by operating the user operation section 103. For example, FIGS. 4B, 4C, and 4D illustrate an example of setting the predetermined width W. FIGS. 4B and 4C illustrate an example of setting the width W of the mask area 503 smaller than the width of the indicator 500. FIG. 4D illustrates an example in which the width W of the mask area 503 is not less than the width of the indicator 500, here, the width W of the mask area 503 is equal to the width of the indicator 500. In this case, when the inclination of the camera apparatus (camera body) 100 in the right and left direction is horizontal (inclination 0), the display of the indicator 500 is in a state of being completely masked by the mask area 503.

Figure 4A:
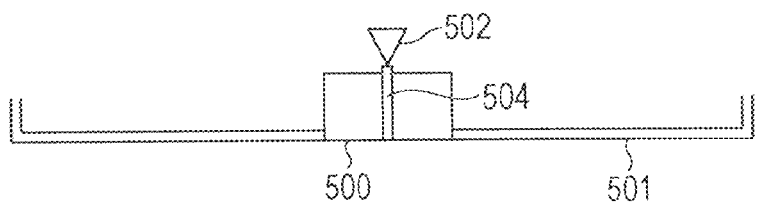
FIGS. 4A, 4B, 4C, 4D, 4E, and 4F are diagrams for explaining a mask area that masks a display of an indicator.
Figure 4B:
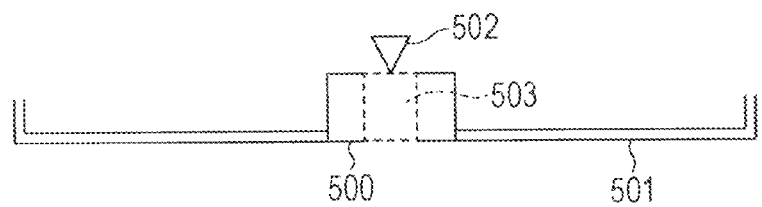
Figure 4C:
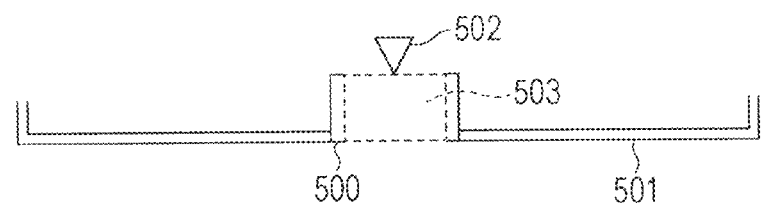
Figure 4D:
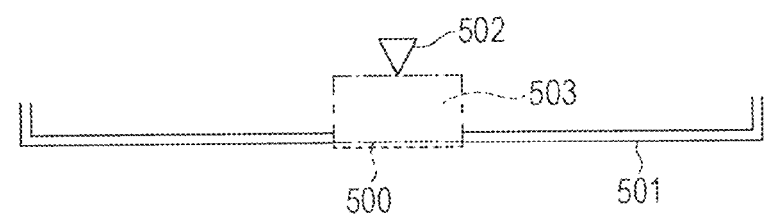
Figure 4E:
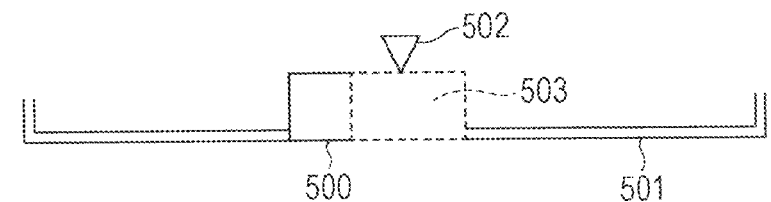
Figure 4F:
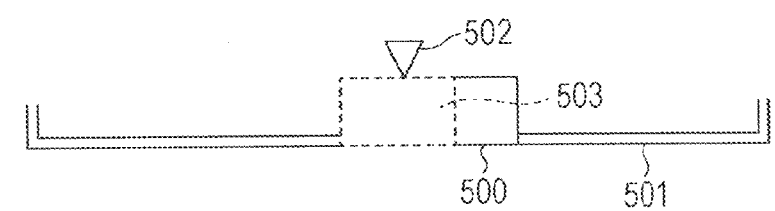

FIG. 4E illustrates a display example of the case where the width W of the mask area 503 is set equal to the width of the indicator 500, and the inclination of the camera apparatus (camera body) 100 in the right and left direction becomes a little downward to the left from horizontality (inclination 0). FIG. 4E illustrates a state in which the indicator 500 moves to the left side a little, and a part of the indicator 500 is displayed with sticking out from the mask area 503. On the other hand, FIG. 4F illustrates a display example of the case where the width W of the mask area 503 is set to the same width of the indicator 500, and the inclination of the camera apparatus (camera body) 100 in the right and left direction becomes a little downward to the right from horizontality (inclination 0). FIG. 4E illustrates a state in which the indicator 500 moves to the right side a little, and a part of the indicator 500 is displayed with sticking out from the mask area 503.

In this regard, FIG. 4A illustrates an example in which the predetermined width W is set to 0. In this case, the indicator 500 becomes a state of substantially not including the mask area 503. In this regard, in the example illustrated in FIG. 4A, a bar-shaped center mark 504 is further displayed at the position indicated by an inverted triangular center mark 502.

Figure 5:
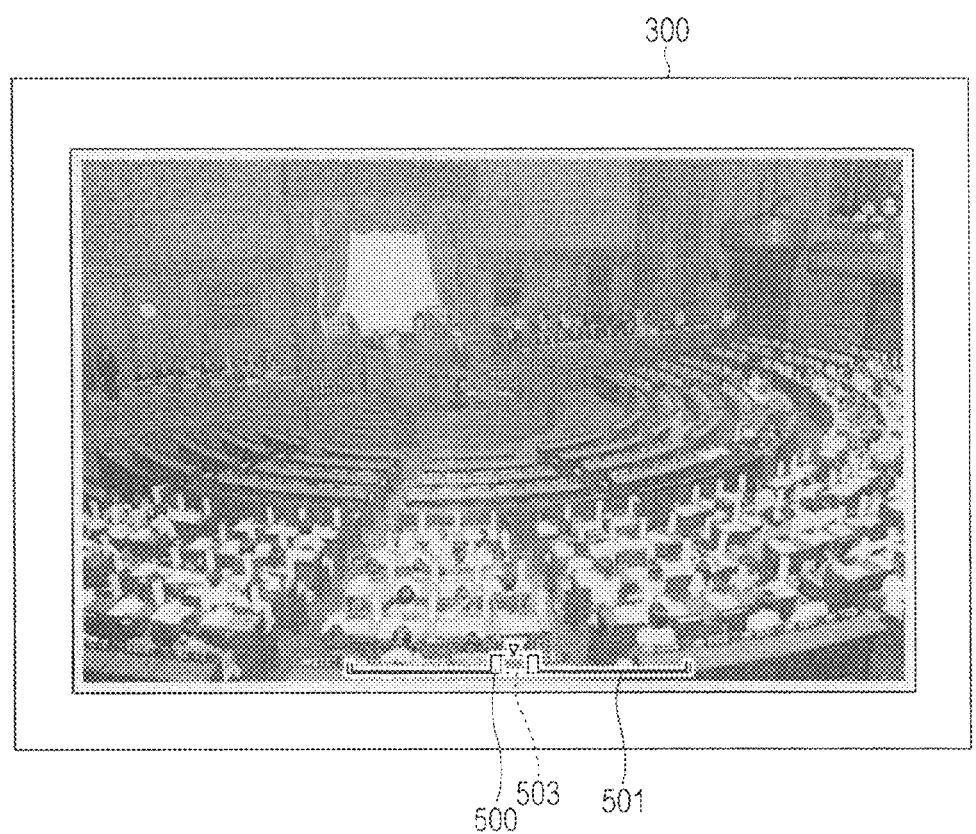
FIG. 5 is a diagram illustrating a more specific display example of the indicator in the view finder.
Figure 6A:
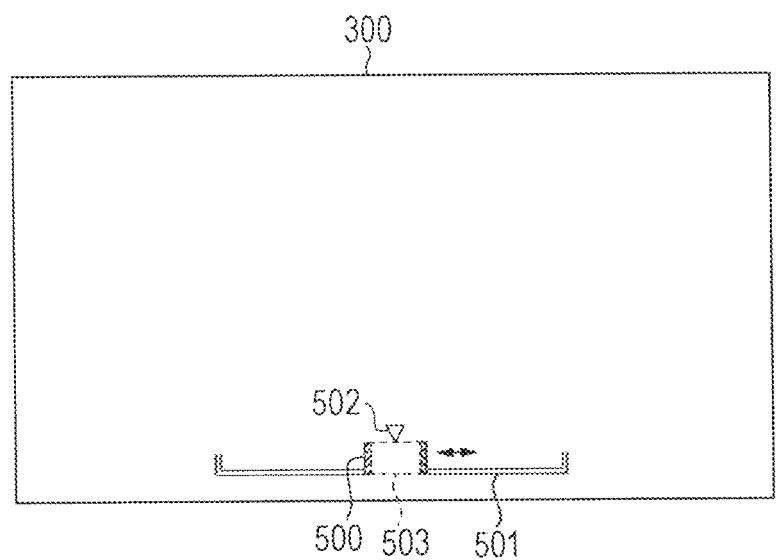
FIGS. 6A and 6B are diagrams illustrating another display example of the indicator in the view finder.
Figure 6B:
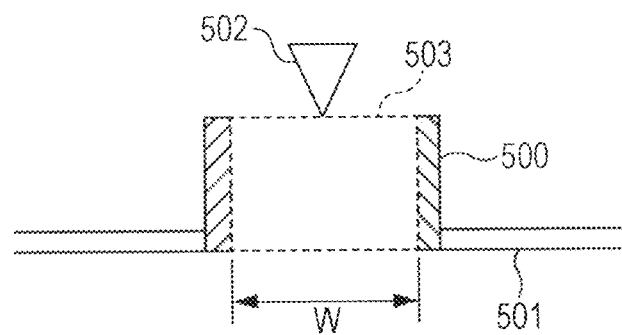
Figure 7A:
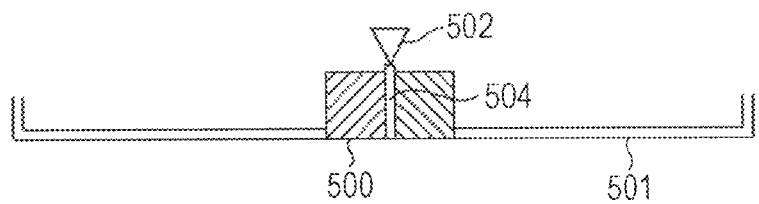
FIGS. 7A, 7B, 7C, 7D, 7E, and 7F are diagrams for explaining a mask area that masks a display of an indicator.
Figure 7B:
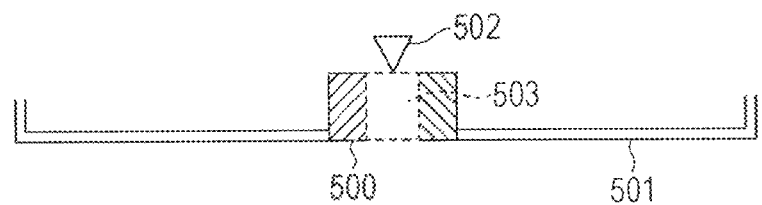
Figure 7C:
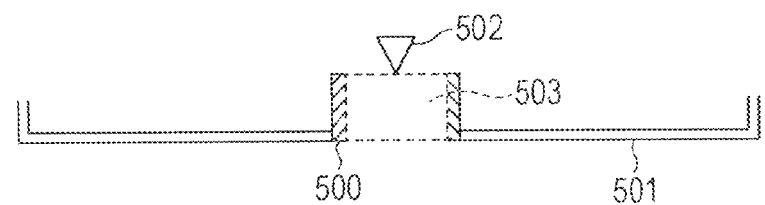
Figure 7D:
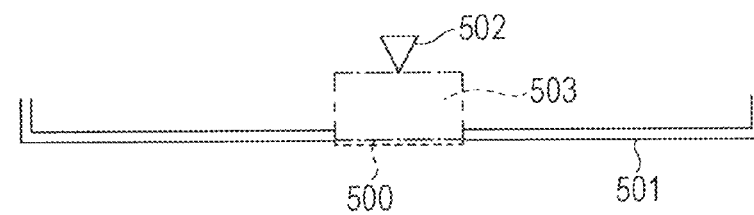
Figure 7E:
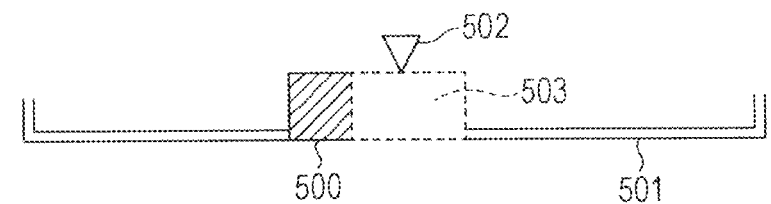
Figure 7F:
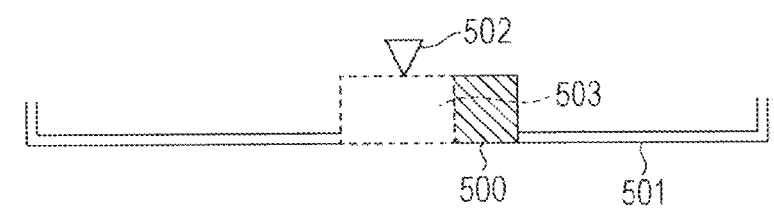
Figure 8:
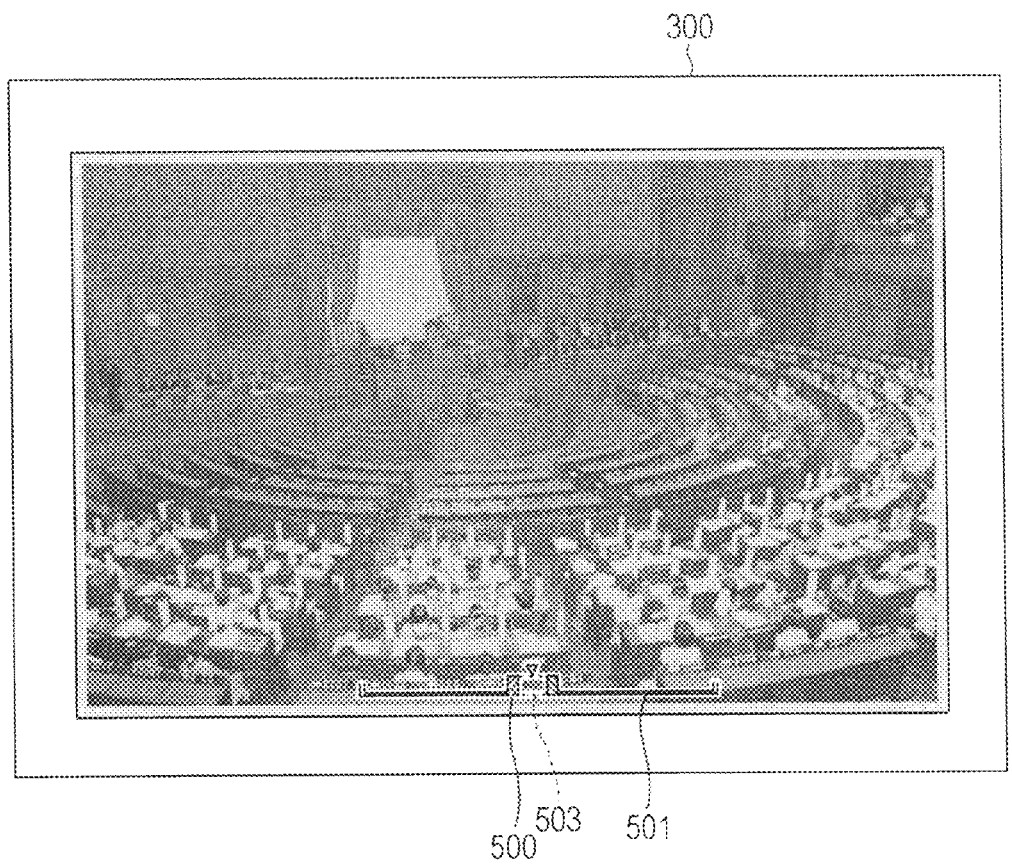
FIG. 8 is a diagram illustrating a more specific display example of the indicator in the view finder.

FIG. 5 illustrates a more specific display example of the view finder 300, which corresponds to FIG. 2A. In this display example, the part of indicator 500 included in the mask area 503 becomes a lost state, and the corresponding part of the captured image is displayed in the lost part without change.

As described above, in the camera system 10 illustrated in FIG. 1, an indicator display signal is generated such that a display of the indicator 500 is masked in the mask area 503 with a position corresponding to a predetermined inclination of the camera body in the right and left direction, for example horizontality (inclination 0) as center. Accordingly, if the inclination of the camera body in the predetermined direction in a steady state or a normal state is a predetermined inclination, for example horizontality (inclination 0), it is possible to suppress a display area of the indicator 500 in the view finder 300 in the steady state or the normal state, and thus it becomes possible to reduce a hindrance of an image display.

Also, in the camera system 10 illustrated in FIG. 1, the camera operator (user) is allowed to set the width of the mask area 503 to a predetermined width W by operating the user operation section 103. Thereby, it becomes possible for the camera operator (user) to set the width of the mask area 503 to a width convenient for him or her. For example, if the width of the mask area 503 is set greater than the width of the indicator 500, it becomes possible to completely eliminate the display area of the indicator 500 in the view finder 300 in the steady state or in the normal state.

2. Variations

In this regard, in the above-described embodiments, no mention has been given on the display mode of the indicator 500, for example, a color or a pattern. For example, it is thought that the color or the pattern of the indicator 500 is made different between one side and the other side with the position (the position indicated by the center mark 502) corresponding to the predetermined inclination, for example horizontality (inclination 0).

In this case, the VF signal processing section 106 of the camera apparatus 100 generates the indicator display signal such that the color or the pattern of the indicator 500 is different between one side and the other side. For example, the color of the indicator 500 (including a part of the indicator) displayed on the left side of the center mark 502 is "red", while the color of the indicator 500 (including a part of the indicator) displayed on the right side of the center mark 502 is "blue".

FIGS. 6A and 6B, FIGS. 7A to 7F, and FIG. 8 individually illustrate display examples of the indicator 500 in individual cases. These figures correspond to FIGS. 2A and 2B, FIGS. 4A to 4F, and FIG. 5, respectively, and thus a same reference numeral is given to a corresponding part, and the detailed description will be omitted. In FIGS. 6A and 6B, FIGS. 7A to 7F, and FIG. 8, the direction of "hatching" of the indicator 500 (including a part of the indicator) is different between one side and the other side so as to represent that the display modes are different.

In this manner, by making the display mode of the indicator 500, for example, a color or a pattern different between one side and the other side with the position corresponding to a predetermined inclination, for example, horizontality (inclination 0) as center, it becomes possible for a camera operator (user) to easily determine whether one side or the other side the camera body is inclined with respect to a predetermined inclination by the color or the pattern of the indicator.

Figure 9:
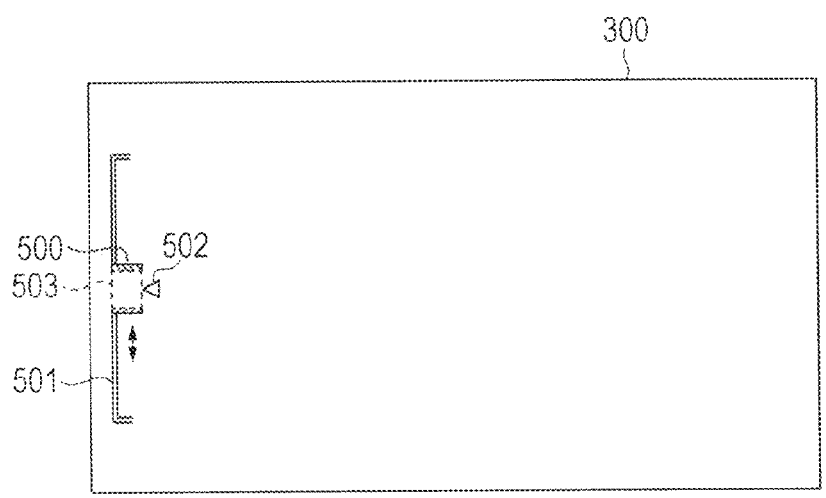
FIG. 9 is a diagram illustrating another display example of the indicator in the view finder.

Also, in the above-described embodiments, an example has been described of the case where the indicator 500 is displayed at a position corresponding to the inclination of the current camera body in the right and left direction in the view finder 300. However, it is possible to apply the present technique not only to the inclination in the right and left direction, but also to the inclination in the other directions, for example, to the case of displaying the indicator 500 at the position corresponding to the inclination of the front and back direction in the same manner as a matter of course. FIG. 9 illustrates a display example of the indicator 500 in that case. In FIG. 9, a same reference numeral is given to a same part corresponding to that in FIG. 2A, and a detailed description thereof will be omitted.

Also, in the above-described embodiments, an example has been described of the case where the camera apparatus 100 is provided with the inclination sensor 102 that detects the inclination of the camera body in the predetermined direction, for example in the horizontal direction or the front and back direction. However, it is thought that the inclination of the camera body is detected by an inclination sensor disposed on a camera platform of a tripod, for example.

Also, it is possible to apply the present technique not only to the case where the indicator 500 is displayed at a position corresponding to the inclination of the current camera body in a predetermined direction in the view finder 300, but also to the following cases. In general, it is possible to apply the present technique to the case where for example, a stage of a predetermined state of a camera (camera system) related to operation of a camera operator (user) is detected, and an indicator is displayed at a position corresponding to the detection stage in the view finder so that the camera operator (user) is visually provided with information on what stage the predetermined state has reached in the same manner.

In this case, the display of the indicator is masked using a mask area having a predetermined width with a position corresponding to a specific stage of a predetermined state of the camera in the movement direction of the indicator as center. Alternatively, in this case, the display mode of the indicator is made different between one side and the other side with a position corresponding to a specific stage of a predetermined state of the camera in the movement direction of the indicator as center. In this case, it becomes possible to obtain the same advantages as those of the above-described embodiments.

Also, it is possible to configure the present technique as follows.

(1) A camera apparatus including:
a display signal generation section configured to generate an indicator display signal for displaying an indicator at a position in accordance with an inclination of a camera body in a predetermined direction; and
a combination section configured to combine a captured image signal with the indicator display signal in order to obtain a view finder image signal,
wherein the display signal generation section generates the indicator display signal such that a display of the indicator is masked using a mask area having a predetermined width and with a position corresponding to a predetermined inclination of the indicator in a movement direction as center.

(2) The camera apparatus according to (1), further including
a user operation section configured to set the predetermined width.

(3) The camera apparatus according to (1),
wherein the predetermined width is set greater than a width of the indicator.

(4) The camera apparatus according to any one of (1) to (3),
wherein the predetermined direction is a right and left direction or a front and back direction.

(5) The camera apparatus according to any one of (1) to (4),
wherein the predetermined inclination is horizontal.

(6) The camera apparatus according to any one of (1) to (5),
wherein the display signal generation section generates the indicator display signal such that a display mode of the indicator is different on one side and the other side with a position corresponding to the predetermined inclination of the indicator in a movement direction as center.

(7) The camera apparatus according to (6),
wherein the display mode of the indicator is a color or a pattern.

(8) The camera apparatus according to any one of (1) to (7), further including an inclination sensor configured to detect an inclination of the camera body in a predetermined direction.

(9) A method of generating a view finder image signal, the method including:
generating an indicator display signal for displaying an indicator at a position in accordance with an inclination of a camera body in a predetermined direction; and
combining a captured image signal with the indicator display signal in order to obtain a view finder image signal,
wherein in the generating an indicator display signal, the indicator display signal is generated such that a display of the indicator is masked using a mask area having a predetermined width and with a position corresponding to a predetermined inclination of the indicator in a movement direction as center.

(10) A camera apparatus including:
a display signal generation section configured to generate an indicator display signal for displaying an indicator at a position in accordance with a stage of a predetermined state of a camera; and
a combination section configured to combine a captured image signal with the indicator display signal in order to obtain a view finder image signal,
wherein the display signal generation section generates the indicator display signal such that a display of the indicator is masked using a mask area having a predetermined width and with a position corresponding to a specific stage of the predetermined state of the camera in a movement direction of the indicator as center.

(11) A camera apparatus including:
a display signal generation section configured to generate an indicator display signal for displaying an indicator at a position in accordance with an inclination of a camera body in a predetermined direction; and
a combination section configured to combine a captured image signal with the indicator display signal in order to obtain a view finder image signal,
wherein the display signal generation section generates the indicator display signal such that a display mode of the indicator is different on one side and the other side with a position corresponding to the predetermined inclination of the indicator in a movement direction as center.

It should be understood by those skilled in the art that various modifications, combinations, sub-combinations and alterations may occur depending on design requirements and other factors insofar as they are within the scope of the appended claims or the equivalents thereof.

What is claimed is:

1. A camera apparatus comprising:
one or more processors configured to
generate an indicator display image by setting a position of an indicator in accordance with an inclination of a camera body and masking a portion of the indicator that is within a mask area such that the portion of the indicator that is within the mask area is not displayed, the portion of the indicator that is within the mask area varying with the inclination of the camera body;
combine a captured image with the indicator display image in order to obtain a view finder image; and
output the view finder image to a screen for display,
wherein the mask area has a predetermined width and is arranged at a position corresponding to a predetermined inclination of the camera body.

2. The camera apparatus according to claim 1, wherein the one or more processors are further configured to
set the predetermined width in response to a user input.

3. The camera apparatus according to claim 1,
wherein the predetermined width is set greater than a width of the indicator.

4. The camera apparatus according to claim 1,
wherein the inclination of the camera body is measured based on a right and left direction or a front and back direction of the camera body.

5. The camera apparatus according to claim 1, wherein the predetermined inclination is horizontal.

6. The camera apparatus according to claim 1, wherein the camera processor is configured to generate the indicator display image such that a display mode of the indicator on one side is different from a display mode of the indicator on the other side with respect to a position corresponding to a center of the mask area.

7. The camera apparatus according to claim 6, wherein the display modes of the indicator differ in colors or patterns.

8. The camera apparatus according to claim 1, further comprising an inclination sensor configured to detect the inclination of the camera body in a predetermined direction.

9. A method of generating a view finder image for display on a screen, the method comprising:
  generating an indicator display image, comprising
    setting a position of an indicator in accordance with an inclination of a camera body in a predetermined direction; and
    masking a portion of the indicator that is within a mask area such that the portion of the indicator that is within the mask area is not displayed, the portion of the indicator that is within the mask area varying with the inclination of the camera body;
  combining a captured image with the indicator display image in order to obtain the view finder image; and
  outputting the view finder image to the screen for display,
  wherein in the generating the indicator display image, the mask area has a predetermined width and is arranged at a position corresponding to a predetermined inclination of the camera body.

10. The method according to claim 9, further comprising:
  setting the predetermined width in response to a user input.

11. A camera apparatus comprising:
  one or more processors configured to
    generate an indicator display image by setting a position of an indicator in accordance with a stage of a predetermined state of a camera and masking a portion of the indicator that is within a mask area such that the portion of the indicator that is within the mask area is not displayed, the portion of the indicator that is within the mask area varying with different stages of the predetermined state of the camera;
    combine a captured image with the indicator display image in order to obtain a view finder image; and
    output the view finder image to a screen for display,
  wherein the mask area has a predetermined width and is arranged at a position corresponding to a specific stage of the predetermined state of the camera.

12. A camera apparatus comprising:
  one or more processors configured to
    generate an indicator display image by setting a position of an indicator in accordance with an inclination of a camera body and masking a portion of the indicator that is within a mask area such that the portion of the indicator that is within the mask area is not displayed, the portion of the indicator that is within the mask area varying with the inclination of the camera body; and
    combine a captured image with the indicator display image in order to obtain a view finder image; and
    output the view finder image to a screen for display,
  wherein a display mode of the indicator on one side is different from a display mode of the indicator on the other side with respect to a position corresponding to a center of the mask area.

* * * * *